Figure 1:
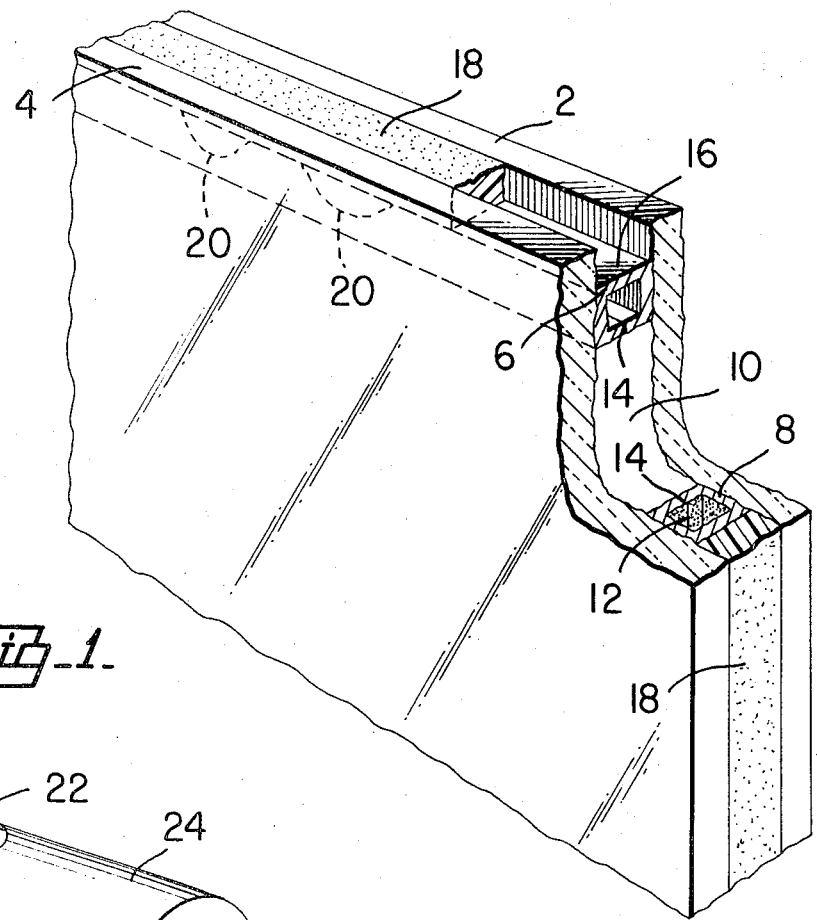

United States Patent [19]

Sitter et al.

[11] 3,852,149
[45] Dec. 3, 1974

[54] INSULATING GLASS WINDOW ASSEMBLIES

[75] Inventors: Matthew M. Sitter, Convent Station, N.J.; Robert M. Meyers, Fairless Hills, Pa.; Edward F. Kutch, Trenton, N.J.

[73] Assignee: Novogard Corporation, Trenton, N.J.

[22] Filed: Apr. 19, 1972

[21] Appl. No.: 245,596

[52] U.S. Cl............ 161/45, 52/172, 52/616, 156/107, 156/109, 161/192, 260/18 EP, 260/23 H, 260/23 R, 260/23.7 B, 260/23.7 M, 260/27 R, 260/27 BB
[51] Int. Cl............ E06b 3/24, C03c 27/00
[58] Field of Search....... 161/43, 45, 127, 192, 199; 156/99, 104, 107, 109, 293, 108; 52/172, 616; 260/18, 23.7

[56] References Cited
UNITED STATES PATENTS

| | | | |
|---|---|---|---|
| 2,990,383 | 6/1961 | Glaser | 260/18 |
| 3,400,090 | 9/1968 | Maslow | 260/23.7 H |
| 3,473,988 | 10/1969 | Rullier et al. | 161/45 |
| 3,527,663 | 9/1970 | Rose et al. | 161/45 |
| 3,544,294 | 12/1970 | Goto | 161/192 |
| 3,654,005 | 4/1972 | Higgins et al. | 156/108 |

FOREIGN PATENTS OR APPLICATIONS 706,370  3/1965  Canada................ 161/45

*Primary Examiner*—George F. Lesmes
*Assistant Examiner*—Paul J. Thibodeau
*Attorney, Agent, or Firm*—Sperry and Zoda

[57] ABSTRACT

Sealed insulating glass window assemblies are produced by arranging sheets of glass with spacers therebetween so as to present an outwardly facing channel about the edges of the assembly and a hot melt sealant characterized by very low moisture vapor transmission is introduced into the channel at an elevated temperature and in a fluid condition to establish an intimate sealing bond between the glass and spacer means. The sealant used is an intimate mixture of an elastomeric polymer, plasticizing and tackifying resins and, in some cases, an adhesion promoter. The sealant is fluid at temperatures above about 200°F and is applied to preassembled glass sheets and spacer members in that condition but upon cooling attains a hardness of about 10 to 80 on the Shore A Durometer scale.

14 Claims, 2 Drawing Figures

INSULATING GLASS WINDOW ASSEMBLIES

FIELD OF INVENTION

Sealed insulating glass window assemblies are widely used and have heretofore been produced by applying a sealant such as a preformed tape or plastic extrusion to a spacer member after which the sheets of glass are assembled with the spacer and pressed against the sealant. A further sealing tape is generally then applied about the assembled spacer and glass sheets and additional metal compression members are often placed in position about the unit to hold the sealant under compression. The spacing strips used are generally made of metal and formed to hold a dissicant for dehydrating the dead air space between the glass sheets. In order further to prevent the leakage of air into or out of the dead air space the ends of the metal spacers are sometimes welded together. Typical constructions of this type are disclosed in U.S. Pats. Nos. 2,933,780; 2,974,377; 3,105,274; 3,226,903; and 3,261,139.

The various operations required to produce such assemblies are time consuming and require considerable skill in order to establish an adequate seal to assure long life of the assembly under the severe conditions presented during use in widely varying weather conditions and in order to comply with accepted test procedures such as ASTM E96-63T Procedure B.

It has also been suggested that spacers and glass sheets may be preassembled and sealed by the application of a two part liquid polysulfide compound to the edges of the assembly by means of a caulking gun as disclosed in U.S. Pat. No. 3,553,913. However, the constituents of such two part liquid polysulfide compositions must be allowed to react for some time before they are fully cured and set which may require several hours and sometimes calls for heating of the assembly in an oven. Moreover, the moisture vapor transmission of cured polysulfide rubber is considerably higher than that of many other elastomeric polymers, such as the butyl polymers.

In accordance with the present invention the sealant employed is a solvent-free hot melt composition which is applied at an elevated temperature and in a fluid condition allowing it to flow into intimate fluid contact with the glass and spacing means so as to establish a positive and effective sealing and adhesive contact with the glass and spacing means. Such sealants may be quickly and easily applied while in a heated condition and upon cooling they harden and undergo substantially no change in properties under wide variations in temperature and after long exposure to the weather. Moreover, the sealants used need not be covered or protected by any tape or other element and need not be held under compression after application to the assembly. Furthermore the sealants are characterized by a very low moisture vapor transmission whereby the useful life of the assembly is greatly increased. It is also found that the sealant is sufficiently strong, elastic, and impervious to render it unnecessary to weld the spacing strips together at the corners to prevent air leakage into or out of the dead air space.

The sealants employed in accordance with the present invention are elastomeric polymers having a molecular weight of at least about 15,000 intimately mixed with plasticizing and tackifying resins, and in some cases adhesion promoters. The sealants are soft or sufficiently fluid at temperatures above about 200°F to permit them to flow readily into sealing, adhesive and fluid contact with the glass and spacing means while solidifying or hardening on cooling without chemical reaction or solvent release. They have a hardness of about 10 to 80 on the Shore A Durometer scale (ASTM C 661-70) and a moisture vapor transmission of less than 8 and generally less than 2 upon being subjected to testing in accordance with ASTM E 96-63T Procedure B.

THE DRAWING

Figure 2:
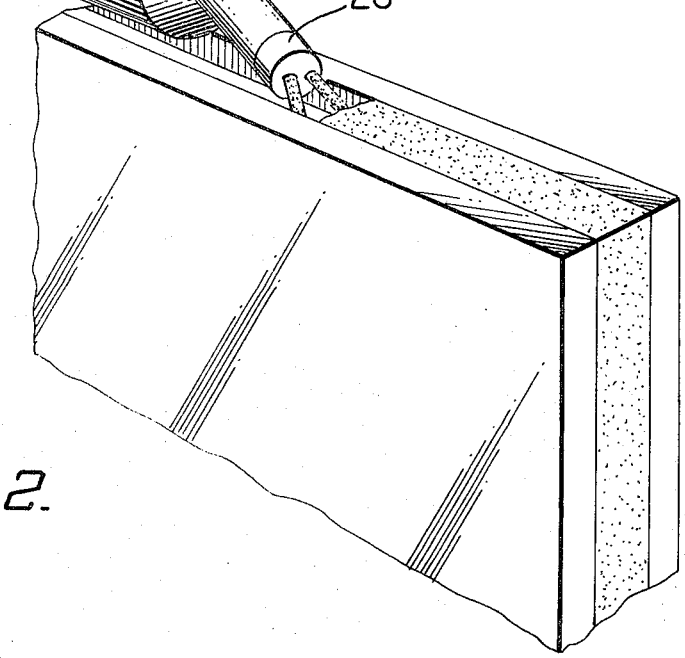

FIG. 1 is a perspective illustrating a typical sealed insulating glass assembly embodying the present invention with parts broken away; and FIG. 2 is a perspective illustrating a typical method which may be employed in producing the assembly of FIG. 1.

In that form of the invention chosen for purposes of illustration in the drawings the insulating glass window or door assembly embodies a plurality of sheets of glass indicated at 2 and 4, which are held in spaced relation by spacing strips or members 6 and 8 so as to provide a dead air space 10 between the sheets of glass.

The spacing members 6 and 8 may be of any conventional type and cross-section and preferably are hollow or otherwise formed to receive a suitable desiccant material 12 such as silica gel, molecular filtering material or the like. They may be formed of aluminum or other metal and are provided with a slot or opening 14 communicating with the dead air space 10 to enable the desiccant material to effectively dehydrate the air within the dead air space.

The spacing strips 6 and 8 are located adjacent the edges of the glass sheets 2 and 4 and preferably are positioned a short distance inward from the marginal edges of the sheets so as to cooperate therewith in defining an outwardly facing channel 16 extending about the entire periphery of the assembly. A hot melt type of sealant is introduced into the channel 16 as shown at 18 and is applied while in a fluid condition so as to flow into intimate and adhering contact with the spacing members and the surfaces of the glass sheets adjacent thereto. Moreover, if there are any irregularities in the surfaces of the glass or the sides of the spacing strips supporting the glass sheets, the sealing material will flow into the resulting crevices or interstices so as to seal the same as indicated in dotted lines at 20.

In order to introduce the sealant material into the channel 16 it is preferable to use a heated portable extruder. A typical extruder which may be used for this purpose is shown in FIG. 2 and is produced and sold by Cities Service Company. The sealant material supplied to such an extruder through a port 22 is heated by an element 24 surrounding a barrel 26 having a screw member therein which forces the sealant through a nozzle or die 28. As shown the die 28 preferably has two oppositely inclined openings which serve to direct the heated sealant into the corners of the channel 16 so that it will not only fill the channel but also assure flow of the sealant while in a hot fluid condition into any crevices or interstices between the spacers and the glass sheets to insure effective sealing of the assembly. The sealant then cools to room temperature in a few minutes so as to harden and complete the assembly quickly and easily.

The composition of the sealant used is of particular importance in order to produce sealed insulating window constructions which will be able to withstand the widely varying conditions of temperature, moisture, and weathering to which it may be subjected. For this purpose the sealant should be a solvent-free intimate mixture of an elastomeric polymer with plasticizing and tackifying resins. In some compositions adhesion promoting agents may be incorporated in order to assure effective bonding of the sealant with both the glass sheets and the metal of which the spacers are formed. The sealant should be sufficiently fluid at temperatures above 200°F to enter into the corners and crevices of the channel 16 of the assembly and upon cooling has a hardness of from about 10 to 80 on the Shore A Durometer. At the same time the sealant should not be heated above about 400°F for any extended length of time in order to avoid degradation or the material. The sealants of the present invention possess sufficient elasticity to permit the limited relative movement of the glass sheets and spacers incident to thermal expansion of the elements and of the air within the dead air spaces between the sheets. In particular the sealants of the present invention are characterized by a moisture vapor transmission rate below 8 grams per square meter per 24 hours as determined in accordance with ASTM-E96-63T Procedure B.

Typical sealing compositions adapted for use in the present invention contain from about 20 to 100 parts by weight of one or more solid elastomeric polymers, from about 15 to 150 parts by weight of plasticizing and tackifying resins and from about 0 to 44 parts by weight of adhesion promoters togehter with from 0 to 150 parts by weight of inert filler materials.

A wide range of elastomeric polymers may be employed in the practice of the present invention and in general are those elastomeric polymers having a molecular weight of from about 15,000 up to 200,000 or 300,000 or more. Typical of such polymers and the trade names by which they are sometimes identified are as follows: butyl rubbers such as copolymers of isobutylene and isoprene (EX214 and PB201); polyisobutylene ("Vistonex" MML 140); styrene-butadiene-styrene polymers ("Kraton" SBS); styrene-isoprene polymers ("Kraton"1102); chlorinated rubbers (Parlon S125) and solid polysulfide polymers ("Thiokol" FA and ST). FA polysulfide rubber is a millable solid gum elastomer which is the reaction product of bis(2-chloroethyl) formal and ethylene dichloride with sodium polysulfide. ST polysulfide rubber is a millable solid gum elastomer which is a reaction product of bis(2-chloroethyl) formal and sodium polysulfide along with 2 mol percent of cross linking agent, 1, 2, 3 -trichloropropane. Modified versions of ST can be made by varying the cross linking agent between 0 and 5.0 mol percent.

The polymers are intimately mixed and blended with plasticizing and tackifying resins such as terpene resins (Piccohesive 125), polyterpene resins ("Wing Tack"95 and "Foral" 105); chlorinated polyphenyl ("Aroclor" 5,460); chlorinated biphenyl ("Aroclor" 1254); polybutenes ("Indopol" 1900); polyisobutylenes (Vistanex LMMS); glycerol esters of hydrogenated rosin (Stablite Ester 10); phenolic resins (SP559); hydrocarbon resins (Nevillac 10 or ERJ683); and parafine oils ("Sun Par" 2100).

When adhesion promoters are used they may be epoxy resins having an epoxide equivalent of about 150 to 3,000, organic silanes, or mixtures thereof. Typical adhesive promoters are the epoxy resins sold by Shell Chemical Company under the names "Epon" 1002, "Epon" 1007 and "Epon" 828. Typical silanes which may be used are those sold by Union Carbide Corporation and identified as A-186 and A-187.

Substantially any inert filler materials may be used as exemplified by carbon blacks, calcium carbonate, talc, titanium dioxide, asbestos fibers or the like. The amount of such fillers, when used, may range from about 5 to 150 parts by weight.

Typical hot melt sealants which may be employed in the practice of the present invention have the compositions in parts by weight and properties as follows:

| Composition No. | 1 | 2 | 3 | 4 | 5 | 6 | 7 |
|---|---|---|---|---|---|---|---|
| EX 214 | 50 | 75 | — | — | — | 50 | 50 |
| FA and/or ST | — | — | 50 | — | — | — | — |
| PB201 | — | — | — | 50 | — | — | — |
| Kraton 1102 | — | — | — | — | 50 | — | — |
| Stearic Acid | 1.0 | 1.0 | 1.0 | 1.0 | 1.0 | 1.0 | 1.0 |
| Aroclor 5460 | 40 | 25 | 40 | 50 | — | — | — |
| Aroclor 1254 | — | — | 75 | — | — | — | — |
| Wing Tack 95 | — | — | — | — | — | 50 | 50 |
| Epon 1002 | 10 | 10 | 10 | 15 | — | — | — |
| Epon 1004 | — | — | — | — | 10 | — | — |
| Epon 1007 | — | — | — | — | — | — | 20 |
| Silane A186 | — | — | — | — | — | — | 2.0 |
| Sun Par 2100 | 50 | — | — | — | — | — | — |
| Indopol 1900 | — | 5.0 | — | 30 | 30 | 25 | 25 |
| Foral 105 | — | — | — | — | 50 | — | — |
| Carbon Black (Sterling MT) | — | — | — | — | 2.0 | — | 2.0 |
| Carbon Black (Statex RH) | 30 | 25 | — | — | — | — | — |
| CaCO₃ (Super Multifix) | — | — | 40 | 40 | 60 | 40 | 40 |
| Hardness (ASTM C661-70 Shore A) | 30 | 28 | 40 | 32 | 40 | 28 | 33 |
| Peel Adhesion in lbs. per linear inch | (180°- after 7 day cure at 75°F) | | | | | | |
| Glass | 7 | 5 | 9 | 6.5 | 8.5 | 10 | 9.0 |
| Anodized Aluminum | 6.5 | 3.5 | 8 | 6 | 7 | 4 | 8.0 |

The moisture vapor transmission of composition No. 3 was between 3 and 8, whereas the moisture vapor transmission of compositions Nos. 1, 2, 4, 5 and 6 was considerably lower as determined by ASTM E96-63T.

The "Peel Adhesion" test was ASTM-D903-49 modifified 180° peel with jaw separation speed of 2 inches per minute and measures the cohesive strength and elasticity of the sealant and the adhesive strength of the sealant to the glass and spacer members.

The composition No. 6 in which no adhesion additive was used showed satisfactory moisture vapor penetration properties although the adhesion to glass failed to comply with the requirements of ASTM E 96-63T Procedure B when immersed in water at 158°F up to 30 days.

In order to indicate preferred hot melt compositions and methods of producing the same the following examples are cited:

Example I

| | |
|---|---|
| Cross linked butyl polymer (EX214) | 50 |
| Polyterpene resin (Wing Tack 95) | 50 |
| Polybutene resin (Indopol 1900) | 75 |
| Stearic Acid | 1 |
| Carbon Black | 25 |
| Epoxy Resin (Epon 1004) | 5 |

In producing the material the butyl polymer, stearic acid and one half of the terpene resin were introduced into a Sigma Blade Baker Perkins mixer and blended together for about 5 minutes after which the balance of the terpene resin and all of the epoxy resin were added as the mixing operation continued. After 10 minutes additional blending all of the polybutene resin was added and after 10 minutes of further mixing the filler was gradually added and mixing the blending continued until a uniform intimate blend of the ingredients has been effected — say about 10 minutes.

During the mixing and blending operation the temperature of the batch tends to rise but is preferably kept below 200°F by water cooling the mixer.

The product thus obtained has a hardness of 28 on the Shore A Durometer at room temperature. The material softens upon heating sufficiently to be easily extruded from a caulking gun which heated the composition to about 200° to 300°F. When used as a sealant in a window assembly it exhibited a rate of moisture vapor transmission less than 8 (ASTM-E96-63T) Procedure B.

Example II

| | |
|---|---|
| Butyl polymer (EX214) | 50 |
| Polyterpene resin (Wing Tack 95) | 50 |
| Polybutene (Indopol 1900) | 25 |
| Stearic Acid | 1 |
| Calcium Carbonate | 40 |
| Epoxy resin (Epon 1007) | 20 |

This product has a hardness of 22 on the Shore A Durometer. It also was fluid and readily extruded from a caulking gun at temperatures of about 200° to 350°F. The moisture vapor transmission was less than 8.

When using the solid polysulfide elastomers "Thiokol FA" and "Thiokol ST", the elastomers are preferably prepared by allowing them to swell and soften by soaking in chlorinated biphenyl (Arochlor 1254) for some time before introducing the elastomer into the mixing and blending equipment.

All of the hot melt compositions described above soften sufficiently at 200°F to permit them to be applied by a heated extrusion device as described above although if greater fluidity is desired for application to assembled glass sheets and spacing members they may be heated up to 350° or even 400°F for at least short periods of time.

The assemblies thus produced are capable of withstanding severe weather conditions and test procedures for long periods of time while being capable of production quickly and easily by unskilled personnel and at a minimum of expense.

While the assembly shown in the drawing embodies only two sheets of glass and a single dead air space it will be apparent that the invention is applicable to other multiple glass assemblies having three, four or more sheets of glass and a corresponding number of dead air spaces therebetween. Similarly although the assemblies are referred to herein as windows the invention is applicable to doors and other constructions. In view thereof it should be understood that the invention is of general application and not limited to the specific forms of the invention and compositions particularly disclosed and described above.

We claim:

1. A window assembly comprising a plurality of panes of glass, spacing means located between said panes of glass adjacent the edges thereof and serving to hold said panes in predetermined spaced relation, said spacing means and glass panes cooperating to present an outwardly facing channel extending about the periphery of the assembly, and a hot melt sealant composition in continuous fluid contact with said glass and spacing means, said sealant being of the type which is fluid at temperatures above about 200°F but hardens upon cooling without undergoing chemical reaction and has a hardness at room temperature of about 10 to 80 on a Shore A Durometer, said sealant composition consisting essentially of from about 20 to 100 parts by weight of an elastomeric polymer having a molecular weight not less than about 15,000 and selected from the group consisting of copolymers of isobutylene and isoprene, polyisobutylene, styrene-butadiene polymers, styrene-isoprene polymers, chlorinated rubber and solid polysulfide polymers; from 15 to 150 parts by weight of plasticizing and tackifying resins; from 0 to about 44 parts by weight of adhesion promoters, and from about 0 to 150 parts by weight of fillers and pigments; said composition having a moisture transmission not exceeding 8 as determined by ASTM-E96-63T procedure B.

2. A window assembly as defined in claim 1 wherein said elastomeric polymer is a copolymer of isobutylene and isoprene.

3. A window assembly as defined in claim 1 wherein said elastomeric polymer is a solid polysulfide rubber.

4. A window assembly as defined in claim 1 wherein said plasticizing and tackifying resins are selected from the group consisting of terpene, polyterpene, polybutene, chlorinated polyphenyl, chlorinated biphenyl resins, polyisobutylenes, hydrocarbon resins, and parafin oils.

5. A window assembly as defined in claim 1 wherein said plasticizing and tackifying resin is polyterpene.

6. A window assembly as defined in claim 1 wherein said tackifying resin is polybutene.

7. A window assembly as defined in claim 1 wherein said adhesion promoter is selected from the group consisting of epoxy resins, organic silanes and mixtures thereof.

8. A window assembly as defined in claim 7 wherein said epoxy resin has an epoxide equivalent of from about 150 to 3000.

9. A window assembly as defined in claim 1 wherein said sealant has substantially the following composition in parts by weight:

| | |
|---|---|
| Cross linked butyl polymer | 50 |
| Polyterpene resin | 50 |
| Polybutene resin | 75 |
| Stearic Acid | 1 |
| Carbon Black | 25 |
| Epoxy Resin | 5 |

10. A window assembly as defined in claim 1 wherein said sealant has substantially the following compositions in parts by weight:

| | |
|---|---|
| Butyl Polymer | 50 |
| Polyterpene resin | 50 |
| Polybutene | 25 |
| Stearic Acid | 1 |
| Calcium Carbonate | 40 |
| Epoxy resin | 20 |

11. A window assembly as defined in claim 1 wherein said sealant has substantially the following composition in parts by weight:

| | |
|---|---|
| Polysulfide rubber | 50 |
| Stearic Acid | 1 |
| Chlorinated Polyphenyl | 40 |
| Chlorinated Biphenyl | 75 |
| Epoxy resin | 10 |
| Calcium Carbonate | 40 |

12. A window assembly as defined in claim 1 wherein said sealant has substantially the following compositions in parts by weight:

| | |
|---|---|
| Butyl Polymer | 50 |
| Stearic Acid | 1 |
| Polyterpene resin | 50 |
| Epoxy resin | 20 |
| Silane | 2 |
| Polybutene | 25 |
| Carbon Black | 2 |
| Calcium Carbonate | 40 |

13. The method of producing an insulating glass window assembly which comprises arranging sheets of glass in spaced parallel relation with spacing members between said sheets and spaced inwardly from the marginal edges of said sheets so as to present an outwardly facing channel about the assembly, heating a hot melt sealant material having the composition as defined in claim 1 to render the sealant relatively fluid, introducing said sealant into said channel and into contact with said glass sheets and spacing members while in a heated and fluid condition and thereafter allowing the sealant to cool and harden in place.

14. The method as defined in claim 13 wherein said sealant is an intimate mixture of an elastomeric polymer with plasticizing and tackifying resins and is relatively fluid at temperatures between about 200° and 400°F.

* * * * *